(12) United States Patent
Hsu et al.

(10) Patent No.: US 8,482,165 B2
(45) Date of Patent: Jul. 9, 2013

(54) VOICE COIL MOTOR HOUSING AND VOICE COIL MOTOR USING SAME

(75) Inventors: Mao-Kuo Hsu, New Taipei (TW); Ming-Ju Lee, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 73 days.

(21) Appl. No.: 13/214,262

(22) Filed: Aug. 22, 2011

(65) Prior Publication Data
US 2013/0002051 A1    Jan. 3, 2013

(30) Foreign Application Priority Data
Jun. 29, 2011   (TW) .............................. 100122725 A

(51) Int. Cl.
*H02K 41/03* (2006.01)
(52) U.S. Cl.
USPC .................................... 310/12.33; 310/12.16
(58) Field of Classification Search
USPC ...................... 310/12.16, 12.33, 89
See application file for complete search history.

(56) References Cited

U.S. PATENT DOCUMENTS

| 6,414,408 | B1 * | 7/2002 | Erdman et al. | 310/68 R |
| 7,450,834 | B2 * | 11/2008 | Makii et al. | 396/55 |
| 7,964,999 | B2 * | 6/2011 | Liao | 310/12.16 |

* cited by examiner

*Primary Examiner* — Dang Le
(74) *Attorney, Agent, or Firm* — Altis Law Group, Inc.

(57) ABSTRACT

A voice coil motor housing includes a top wall having an opening and four sidewalls extending from the top wall. The four sidewalls and the top wall cooperatively form a rectangular chamber opened at one end. Each of the sidewalls includes a top portion and a bottom portion. The top portions of the four sidewalls are connected to one another and forming a substantially gapless seam between each two adjacent sidewalls at the top portions. At least one slot is defined in the bottom portions of the sidewalls, the at least one slot is perpendicular to the top wall, and the slot is arranged adjacent to the corresponding gapless seam. At least one snap is arranged on the sidewalls at the corresponding bottom portion thereof, and the at least one snap protrudes inwardly of the chamber.

11 Claims, 4 Drawing Sheets

VOICE COIL MOTOR HOUSING AND VOICE COIL MOTOR USING SAME

BACKGROUND

1. Technical Field

The present disclosure relates to voice coil motors, and particular to a voice coil motor housing and a voice coil motor using the housing.

2. Description of Related Art

Voice coil motors are widely used in camera modules for driving lenses. Many voice coil motors use electrified wire coils and magnets to cooperatively drive lenses. One voice coil motor includes a base, a fixed barrel, a movable barrel, a wire coil and a plurality of magnets. The lenses to be driven are received in the movable barrel. In order to avoid electromagnetic interference, the voice coil motor further includes an electrically conductive housing for receiving the voice coil motor and shielding from the electromagnetic interference.

An electrical conductive housing may include four separate sidewalls, such that the sidewalls have the flexibility to adapt to voice coil motor bodies in different sizes. However, because of the flexibility, it is difficult to precisely position a voice coil motor body in such a housing.

What is needed, therefore, is a voice coil motor housing and a voice coil motor, which can overcome the above shortcomings.

BRIEF DESCRIPTION OF THE DRAWINGS

Many aspects of the present voice coil motor housing and voice coil motor can be better understood with reference to the following drawings. The components in the drawings are not necessarily drawn to scale, the emphasis instead being placed upon clearly illustrating the principles of the present voice coil motor housing and voice coil motor. Moreover, in the drawings, like reference numerals designate corresponding parts throughout the several views.

DETAILED DESCRIPTION

Embodiments of the present voice coil motor housing and voice coil motor will now be described in detail below and with reference to the drawings.

Figure 1:
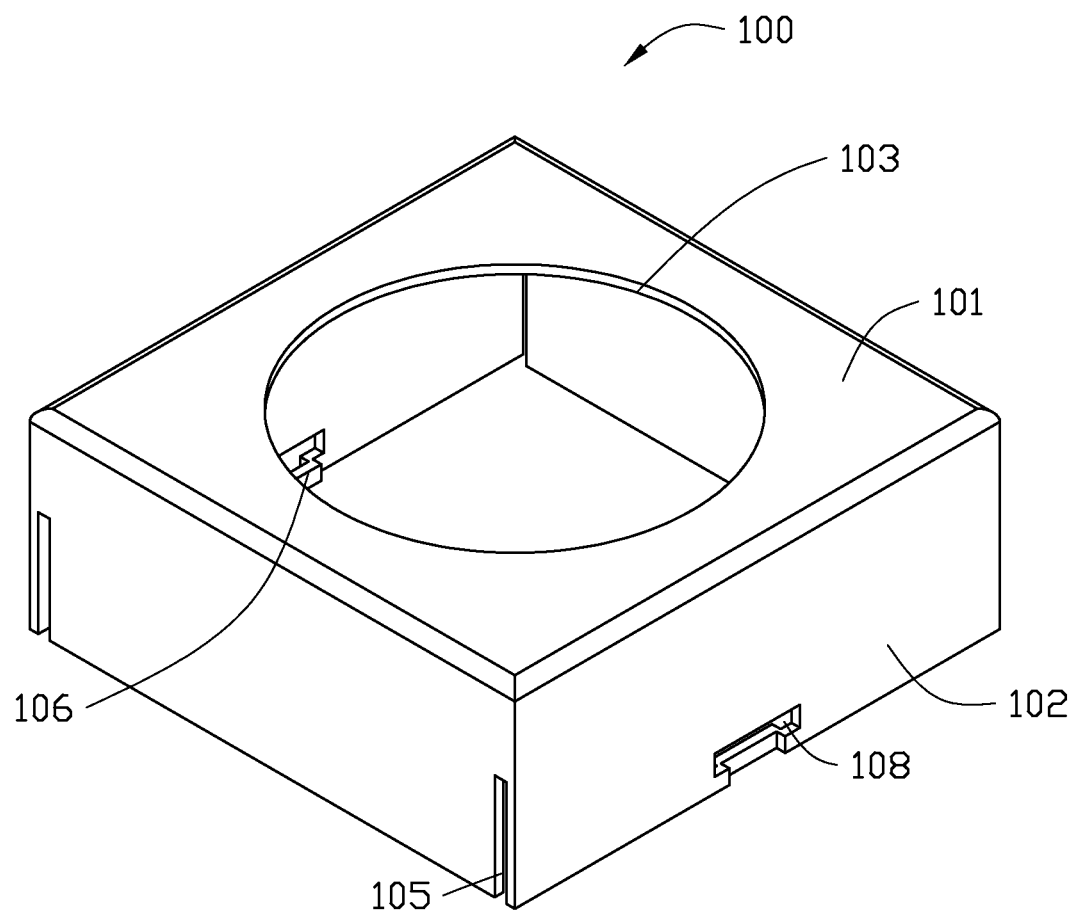
FIG. 1 is a schematic, isometric view of a voice coil motor housing in accordance with one embodiment.
Figure 2:
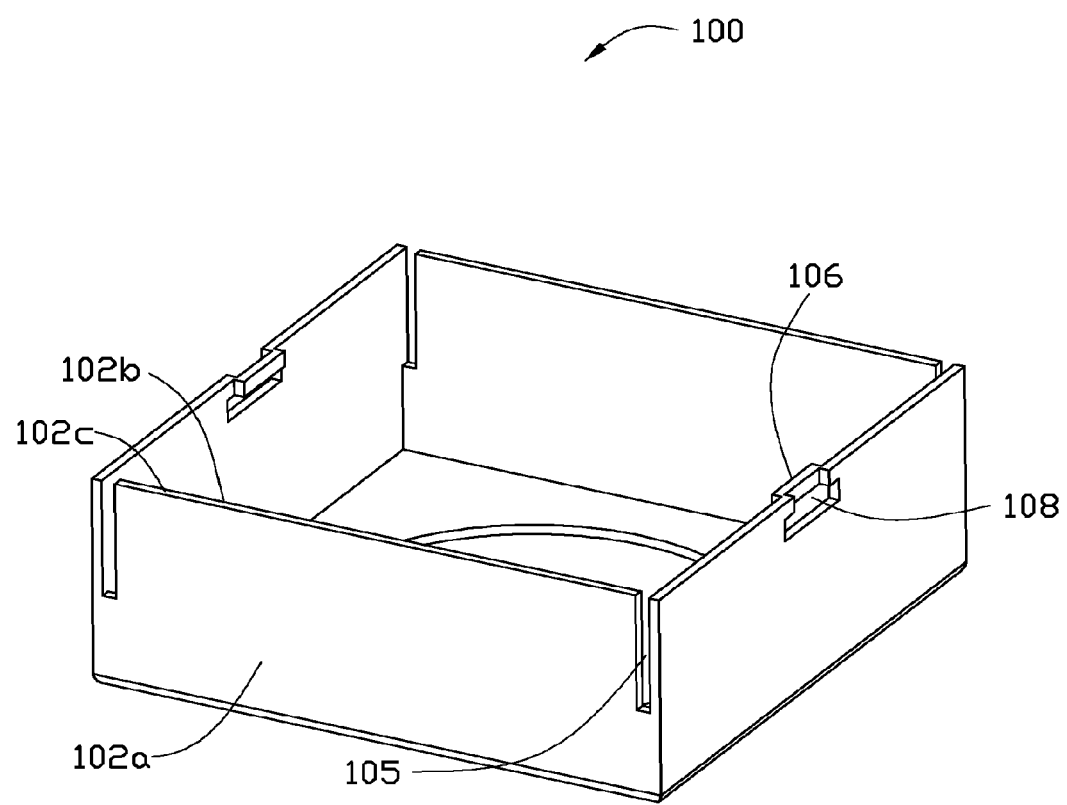
FIG. 2 is similar to FIG. 1, but shows the voice coil motor housing in an opposite view.

Referring to FIGS. 1 and 2, a voice coil motor housing 100 is shown. The housing 100 includes a top wall 101 and four sidewalls 102. The top wall 101 defines a central opening 103. The top wall 101 and the four sidewalls 102 cooperatively form a rectangular chamber, which is open at one end.

The top wall 101 and the four sidewalls 102 are integrally formed into one piece, and the four sidewalls 102 extend away from the top wall 101 to form the rectangular chamber. The entire voice coil motor housing 100 can be made by stamping. A material of the top wall 101 and the four sidewalls 102 can be selected from electrically conductive metallic materials, which can shield against electromagnetic interference. Each of the top wall 101 and the four sidewalls 102 has a thickness of about 0.1 centimeters. Top portions of the four sidewalls 102 are continuously connected without any gaps. The top portions of the four sidewalls 102 are connected to one another and forming a substantially gapless seam between each two adjacent sidewalls 102 at the top portions. Each bottom portion of two sidewalls 102, which are opposed to each other, defines two slots 105, and each bottom portion of the other two sidewalls 102 defines a snap 106. The sidewalls 102 with snaps 106 thereon are free of the at least one slot 105 defined therein.

The two slots 105 of each of the sidewalls 102 are located at two ends of the corresponding sidewall 102, respectively. Each slot 105 is perpendicular to the top wall 101, and exposed to a bottom surface 102c of the corresponding sidewall 102, and ends at a position of the sidewall 102 adjacent to the top portion. Each of the sidewalls 102 has an outer surface 102a and an inner surface 102b opposite to the outer surface 102a. The bottom surface 102c connects to the outer surface 102a and the inner surface 102b. The slot 102 passes through the outer surface 102a and the inner surface 102b. Each slot 105 is configured for providing elasticity to the sidewall 102. The snaps 106 protrude inwardly the inside of the voice coil motor housing 100. The positions of the sidewalls 102 corresponding to the snaps 106 each have a recess 108 for facilitating taking the voice coil motor housing 100.

It is understood that, in other embodiments, the four sidewalls 102 can have only one slot 105, or one sidewall 102 can have more than two slots 105. As top portions of the four sidewalls 102 are continuously connected, the entire voice coil motor housing 100 can have only one snap 106.

Figure 3:
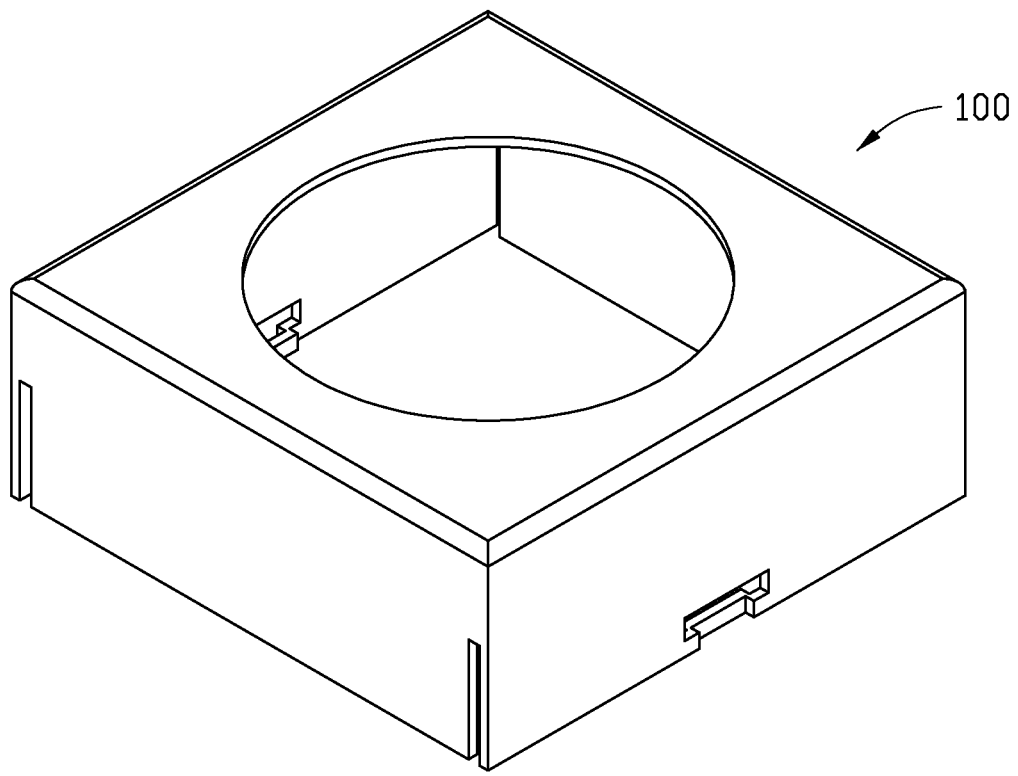
FIG. 3 is an exploded view of a voice coil motor in accordance with one embodiment.
Figure 3:
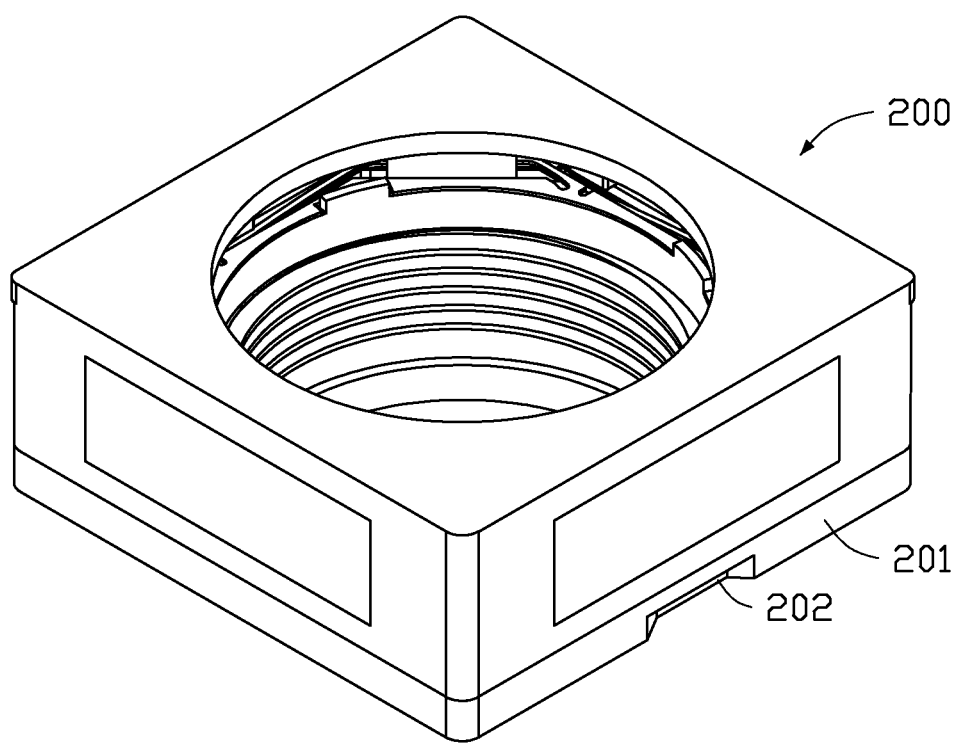
Figure 4:
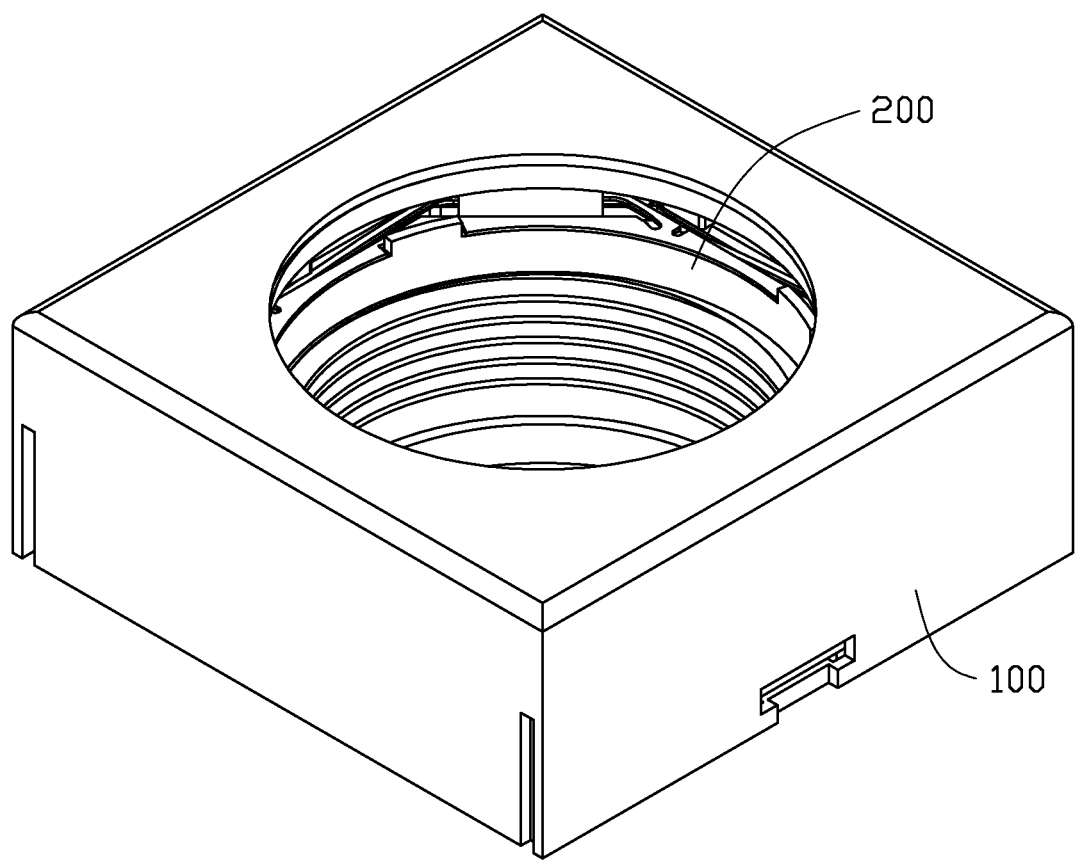
FIG. 4 is an assembled view of the voice coil motor of FIG. 3.

Referring also to FIGS. 3 and 4, a voice coil motor 200 using the voice coil motor housing 100 has a base 201, and the base 201 has a cutout 202. The snap 106 snaps in the cutout 202, such that the voice coil motor housing 100 is fastened to the base 201.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A voice coil motor housing, comprising:
    a top wall, the top wall having an opening; and
    four sidewalls extending downward from the top wall, the four sidewalls and the top wall cooperatively forming a rectangular chamber opened at one end, each of the sidewalls including a top portion and a bottom portion, the top portions of the four sidewalls being connected to one another and forming a substantially gapless seam between each two adjacent sidewalls at the top portions, at least one slot defined in the bottom portions of the sidewalls, the at least one slot being perpendicular to the top wall, the at least one slot arranged adjacent to the corresponding gapless seam, at least one of the four sidewalls having an outer surface, an inner surface opposite to the outer surface, and an bottom surface connected to the outer surface and the inner surface, the at least one slot passing through the outer surface, the inner surface, and the bottom surface; and at least one snap being arranged on the sidewalls at the corresponding bottom portion thereof, the at least one snap protruding inwardly of the chamber.

2. The voice coil motor housing of claim 1, wherein the opening is located at a center of the top wall.

3. The voice coil motor housing of claim 1, wherein the top wall and the four sidewalls are integrally formed into one piece by stamping.

4. The voice coil motor housing of claim 3, wherein the voice coil housing is comprised of metallic material.

5. A voice coil motor, comprising:
   a voice coil motor housing of claim 1; and
   a voice coil motor body having a base, the base having at least one cutout corresponding to the at least one snap of the voice coil motor housing, the at least one snap snappingly engaged in the at least one cutout such that the voice coil motor housing is fastened to the base of the voice coil motor body.

6. The voice coil motor of claim 5, wherein the opening is located at a center of the top wall.

7. The voice coil motor of claim 5, wherein the at least one slot includes two slots arranged on a pair of opposite sidewalls.

8. The voice coil motor of claim 7, wherein the at least one snap includes two snaps arranged on the other pair of opposite sidewalls.

9. The voice coil motor of claim 8, wherein the other pair of opposite sidewalls with the snaps thereon are free of the at least one slot defined therein.

10. The voice coil motor of claim 5, wherein the top wall and the four sidewalls are integrally formed into one piece by stamping.

11. The voice coil motor of claim 10, wherein the voice coil housing is comprised of metallic material.

* * * * *